United States Patent [19]
Bains

[11] Patent Number: 5,940,848
[45] Date of Patent: Aug. 17, 1999

[54] COMPUTER SYSTEM AND METHOD FOR EFFICIENTLY CONTROLLING THE OPENING AND CLOSING OF PAGES FOR AN ABORTED ROW ON PAGE MISS CYCLE

[75] Inventor: Kuljit Bains, Folsom, Calif.

[73] Assignee: Intel Corporation, Santa Clara, Calif.

[21] Appl. No.: 08/783,018

[22] Filed: Jan. 14, 1997

[51] Int. Cl.[6] .......................... G06F 12/00; G11C 11/407
[52] U.S. Cl. .................. 711/1; 711/105; 711/122; 711/137; 365/238.5; 365/193; 365/203
[58] Field of Search ...................... 711/118, 105, 711/204, 206, 208, 209, 213, 167, 137, 154, 104, 122, 1, 100; 365/203, 193, 238.5

[56] References Cited

U.S. PATENT DOCUMENTS

| | | | |
|---|---|---|---|
| 4,933,910 | 6/1990 | Olson et al. | 365/238.5 |
| 5,184,320 | 2/1993 | Dye | 711/118 |
| 5,239,639 | 8/1993 | Fischer et al. | 711/167 |
| 5,253,214 | 10/1993 | Herrmann | 365/203 |
| 5,301,292 | 4/1994 | Hilton et al. | 711/157 |
| 5,301,299 | 4/1994 | Palowski et al. | 711/5 |
| 5,428,759 | 6/1995 | Smith et al. | 711/209 |
| 5,463,759 | 10/1995 | Ghosh et al. | 711/105 |
| 5,469,555 | 11/1995 | Ghosh et al. | 711/133 |
| 5,479,635 | 12/1995 | Kametani | 711/105 |
| 5,487,049 | 1/1996 | Hang | 365/238.5 |
| 5,530,823 | 6/1996 | Tsuchiya et al. | 711/207 |
| 5,537,553 | 7/1996 | Kakiage | 711/125 |
| 5,604,883 | 2/1997 | King et al. | 711/154 |
| 5,651,130 | 7/1997 | Hinkle et al. | 711/167 |
| 5,664,153 | 9/1997 | Farrell | 711/154 |
| 5,701,433 | 12/1997 | Moriarty et al. | 711/154 |
| 5,715,421 | 2/1998 | Akiyama et al. | 365/203 |
| 5,778,446 | 7/1998 | Kim | 711/167 |

*Primary Examiner*—Glenn Gossage
*Attorney, Agent, or Firm*—Blakely, Sokoloff, Taylor & Zafman

[57] ABSTRACT

A computer system including a processor and a storage device and a method for accessing at least one page of the storage device, are described. The computer system further includes a control circuit coupled to the processor and to the memory device. The control circuit is configured to change a state, such as open or closed, of the at least one page, when one of a page miss and row miss cycle to that at least one page is aborted. The control circuit is configured to restore the state of the at least one page a predetermined number of cycles after the state of the at least one page was changed. Performance benefits may be obtained in a computer system including a second level (L2) cache if upon a page miss or row miss cycle that has been aborted, the state of a page previously accessed is restored. The paging process efficiently controls the opening and closing of pages and takes into account the system architecture and the occurrence of certain events such as a host bus being idle, a cycle being aborted, etc.

9 Claims, 6 Drawing Sheets

COMPUTER SYSTEM AND METHOD FOR EFFICIENTLY CONTROLLING THE OPENING AND CLOSING OF PAGES FOR AN ABORTED ROW ON PAGE MISS CYCLE

BACKGROUND OF THE INVENTION

1. Field of the Invention

The present invention relates to the field of computer systems. More particularly, the present invention relates to accessing memories in computer systems.

2. Description of Related Art

A main memory is an important part of a memory subsystem of a computer system. The main memory typically includes an array of dynamic random access memories (DRAMs) that are configured to temporarily store application programs, other software codes for use by the computer system, and data. The performance of a memory is measured in terms of its ability to quickly respond to memory access requests from a processor.

A DRAM (hereinafter referred to as "memory") typically includes a plurality of rows and columns. Each row may include at least one page. An access to the memory (hereinafter "memory cycle") may typically be performed by a sequence of events where the Central Processing Unit (CPU), initially, generates an address (current address) to a local bus or host bus. A memory controller, coupled to the local bus, decodes the current address and accordingly determines which row and column of the main memory corresponds to the current address. Moreover, the memory controller drives the current address to the memory to select a page corresponding to the current address. Once the memory controller determines what row corresponds to the current address, a Row Address Strobe (RAS#) signal is generated and asserted to the respective row. The sign "#" following a name of a signal such as RAS, indicates that the respective signal is "active low", i.e., the respective signal causes a certain effect when that signal is at "0" logic. Subsequently, while the RAS# signal is asserted to the addressed row and a page is selected in that row, the memory controller asserts a Column Address Strobe (CAS#) signal to an addressed column. After CAS# is asserted, the DRAM typically either provides data, i.e., a read operation, or latches data, i.e., a write operation. Typically, at the beginning of a memory access cycle, both RAS# and CAS# are deasserted and are kept deasserted for at least an amount of time equal to a respective precharge times for these signals. The concept of RAS# and CAS# precharge is well-known in the art.

To increase the speed of a memory cycle, some users configure the memory controller to utilize page hit cycles. A page hit cycle (hereinafter referred to as "page hit") is defined as: a memory cycle where a current row address is the same as the row address generated by the CPU during a most recent memory cycle; and the RAS# signal for that respective row is asserted. A page hit requires fewer clock cycles to be completed for a memory cycle because the RAS# signal is already asserted at the beginning of the cycle thereby avoiding the time incurred by the RAS# precharge time.

A "page miss" occurs when the current address differs from the previous address but the row corresponding to that address is the same as the most recently addressed row. A "row miss" cycle occurs when a page currently addressed is found in a row different than the most recently addressed row. A row miss cycle requires that a new RAS# signal corresponding to a currently addressed row is asserted to that row. Such access is slower than a page hit where RAS# remains asserted, as the system must wait for the appropriate different RAS# signal to settle in its asserted state before the CAS# signal is asserted. However, a row miss cycle typically requires less clock cycles than a page miss cycle since the system requires that the RAS# signal be deasserted and then asserted to the same row while the new address is presented to the memory. This causes the system to wait for the RAS# signal to settle in its deasserted state and then to settle in its asserted state, before the CAS# signal is asserted.

It has been found that the number of memory cycles needed to access a memory may be different for different system architectures. Also, the number of memory cycles needed may differ depending on whether a page is left open or a page is closed. Furthermore, depending on the system's architecture, occurrence of certain events in the system, such as a cycle abort, may affect the number of needed memory cycles. For example, it has been determined that when a page miss or row miss cycle occurs and that cycle is thereafter aborted, systems endowed with a second level cache may need a different number of memory cycles, depending on the state of the pages addressed, i.e. page open or page closed.

It is desirable to provide a paging process and a computer system that implements a paging process that efficiently controls the opening and closing of pages and takes into account the system architecture and the occurrence of certain events in the computer system such as the host bus being idle, a cycle being aborted, etc.

SUMMARY OF THE INVENTION

The present invention provides a computer system that includes a processor and a storage device coupled thereto. The storage device includes at least one page. The computer system further includes a control circuit coupled to the processor and to the storage device. The control circuit is configured to change a state of the at least one page, when one of a page miss and row miss cycles to that at least one page is aborted. The control circuit is configured to restore the state of the at least one page a predetermined number of cycles after the state of the at least one page was changed.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

The present invention provides a paging process and apparatus for providing access to pages of a memory of a computer system. For purposes of explanation, specific embodiments are set forth to provide a thorough understanding of the present invention. However, it will be understood by one skilled in the art, from reading this disclosure, that the invention may be practiced without these details. Moreover, well-known elements, devices, process steps and the like are not set forth in detail in order to avoid obscuring the present invention.

Figure 1:
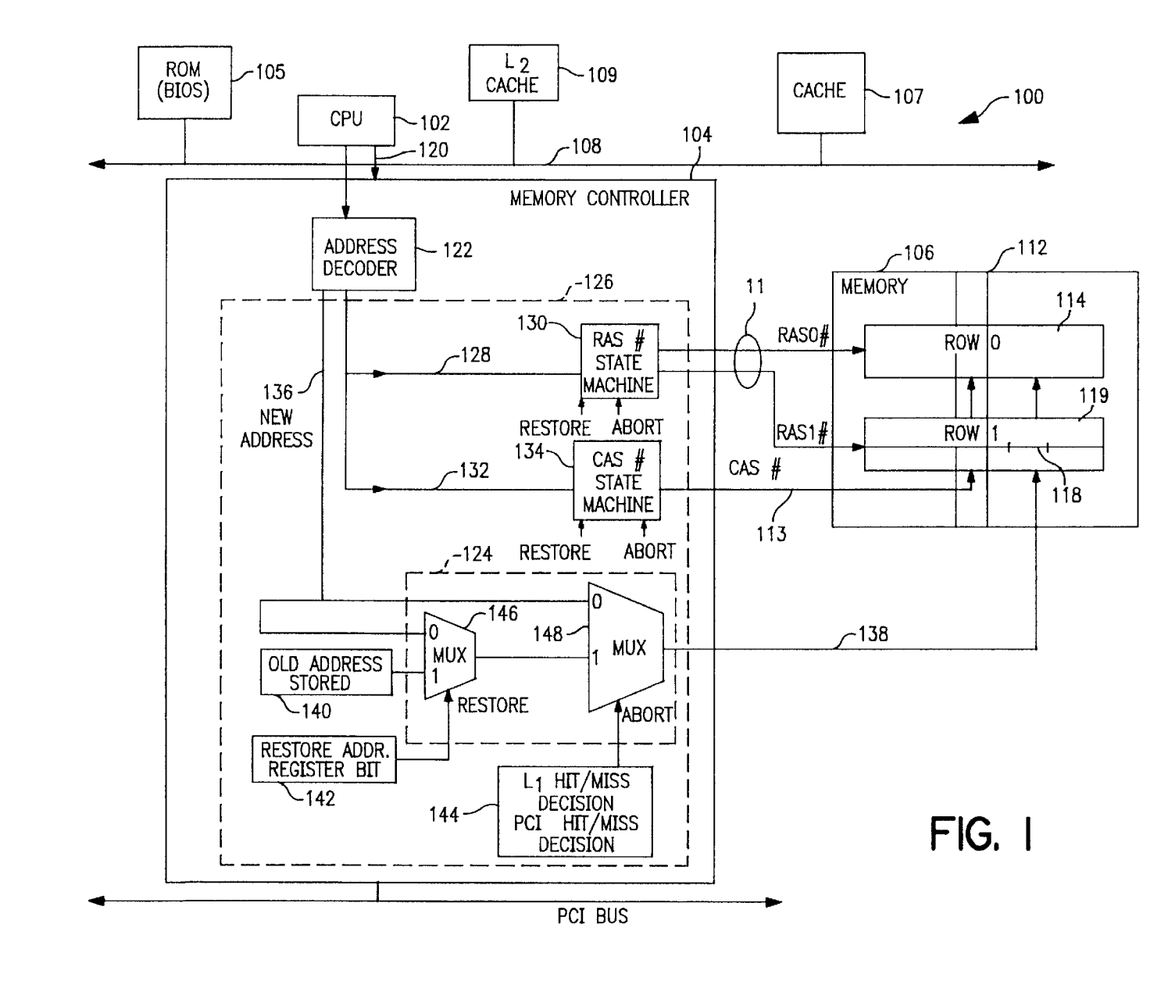
FIG. 1 illustrates one embodiment of a computer system according to the present invention.

FIG. 1 illustrates a computer system 100 according to the present invention. Computer system 100 includes a central processing unit (CPU) 102 configured to process instructions. The CPU 102 is coupled to bus 108 through which the CPU communicates with other devices coupled to that bus. The computer system 100 also includes a read only memory (ROM) 105 that stores the basic input/output system (BIOS) code as well as other types of code in some embodiments. The BIOS code is executed by the CPU 102 when the CPU is powered up or restarted, and operates to initialize the computer system to a predetermined state.

The computer system 100 further includes a storage device controller 104 coupled to bus 108. The storage device controller 104 controls access to the storage device 106. In one embodiment according to the present invention, the storage device controller 104 comprises a memory controller (hereinafter referred to as "memory controller" or DRAM controller,") 104 while the storage device 106 comprises a main memory that may be a DRAM (hereinafter "memory" or "DRAM"). The DRAM controller 104 may be coupled to memory 106 through RAS# lines 111, CAS# lines 113, MA bus lines 136 and 138, as well as other address and control signal lines (not shown). A typical DRAM such as 106 includes a plurality of rows 114, of which Row0 and Row1 are shown in FIG. 1, but a DRAM in connection with the present invention is not limited to a DRAM having two rows. Each row includes at least one of a plurality of pages, of which page 118 is shown in the figure. Moreover, the DRAM includes a plurality of columns of which column 112 is shown in FIG. 1. Read/write access to a DRAM by way of a memory controller is well-known in the art.

CPU 102 may access memory device 106 by driving an address (hereinafter "current address") to memory controller 104 and shortly thereafter an address strobe signal (ADS) 120. The current address is decoded by address decoder circuit 122 (hereinafter referred as "decoder") into a row address and a column address. The decoder 122 also determines whether a cycle is a page miss, a page hit, or a row miss, and drives this information to a Row Address Strobe (RAS#) state machine 130.

Typically the higher order bits of an address include the address of a row to be accessed while the lower order bits of the address include the address of a column to be accessed. Based on this configuration, address decoder 122 drives a decoded row address through decoded row address line 128 to the RAS# state machine 130 and a decoded column address through decoder column address line 132 to a Column Address Strobe (CAS#) state machine 134. Based on the row address driven to the RAS# state machine 130, the RAS# state machine 130 generates a Row Address Strobe (RAS#) signal to a corresponding Row. When the RAS# signal is asserted (i.e. RAS# is at logic 0), a specific row corresponding to the RAS# signal (in this example Row 0 or Row 1) is "enabled" allowing data presented to a data line (not shown), coupled to DRAM 106, to be stored into the DRAM (write operation) or to drive data stored therein to datalines (not shown).

In the embodiment of the present invention described herein, the RAS# signal is held high for a number of clock cycles (RAS# precharge time) at the beginning of each memory cycle. Also in the embodiment described herein, the precharge time equals three clock cycles, but the present invention is not limited in scope to this number of cycles. After the lapse of the precharge time, the RAS# signal is then asserted to an addressed row. The memory address is driven, substantially concurrently, to a corresponding addressed page, such as page 118, of DRAM 106. Then, based on a decoded column address driven to the CAS# machine 134, a column address strobe (CAS#) signal is generated and driven to an addressed column of memory device 106.

The computer system 100 implements a speculative paging process where a page is left open after an access thereto if host CPU bus 108 is not idle or if a peripheral bus, such as a peripheral component interconnect (PCI) bus, owns the host bus. A page is closed if a PCI bus does not own the host bus and the host bus 108 is idle for a predetermined time. A page may be left open by keeping the RAS# signal that corresponds to the row including that page asserted. In this way, DRAM pages may be speculatively set up for a next read access from the CPU, thereby saving clock cycles when certain conditions occur. For example, if a current memory access from the CPU arrives within a predetermined time from a previous memory access, it is more likely that the current memory access is to the same page. Therefore, by leaving the previously accessed page open, more page hit cycles to the memory may take place, thereby reducing the access time thereto. The speculative paging process may be optimized according to results of benchmarking of an application and an operating system in conjunction with which computer system 100 operates.

The present invention employs a typical CAS# state machine 134 that receives a decoded column address via line 132 and selectively generates CAS# signals 113. The implementation of a CAS# state machine 134 is standard and well-known to those skilled in the art.

The computer system 100 according to the present invention implements three different types of memory cycles: page hit, page miss, and row miss. Typically, CPU read cycles to DRAM are forwarded thereto in parallel with CPU read cycles to a second level (L2) cache 109 or the PCI bus 170 in systems utilizing an L2 cache 109 and/or a PCI bus. If a read cycle targets L2 cache 109 or PCI bus, the memory cycle to the DRAM is aborted. To reduce access time when a cycle is aborted, the system is configured to cause a new page to be opened, or the previously opened page to be closed, depending on which of the three memory cycles described above occurs.

Memory controller 104 further includes a selecting device 124 (shown within a dotted line) that receives at one input thereof a current address signal driven by the decoder through line 136 (new address). The selecting device 124 also includes a second input that is coupled to a storage device 140, such as a register, that stores an address of the page previously accessed (old address). Selecting device 124 further has two control inputs. One control input is coupled to a restore address register 142 that stores a restore bit. A restore bit is a bit that when asserted, causes the memory controller to restore the old address of the page previously accessed. In the embodiment described herein, the restore bit is set by a chipset (not shown) that includes memory controller 104.

The second control input of selecting device 124 is coupled to a circuit 144 configured to determine whether a current access is directed to a second level (L2) cache 109 or to the PCI bus 170. If the current access is directed to an access to L2 cache 109 or to PCI bus 170, circuit 144 asserts an ABORT signal to selecting device 124.

It has been determined that when an L2 cache 109 is included in a computer system, performance benefits may ensue if upon a page miss or row miss cycle that has been aborted, the state of a page previously accessed, i.e. a state of page open or closed, is restored. For example, if a page was open in the most recent cycle, the state of a page is restored by closing it and then opening it after a predetermined number of cycles. If a page was closed in the most recent cycle, the page is restored by opening it and then closing it after a predetermined number of cycles. The predetermined number of cycles needs to be at least equal to the RAS# precharge time.

Selecting device 124 includes a first selecting circuit 146 and a second selecting circuit 148 coupled thereto. In the embodiment described herein, selecting devices 146 and 148 are multiplexors. When the restore bit is set, first multiplexor 146 selectively gates at its output the old address (the most recent memory address generated by CPU 102) stored in register 140. Assuming that a cycle is not aborted, second multiplexor 148 selectively gates at its output on line 138 the new address signal driven to a "0" input of this multiplexor. However, if the cycle is aborted and the restore bit is set, the asserted ABORT signal causes multiplexor 148 to selectively gate at its output the old address driven by multiplexor 146 to a "1" input of multiplexor 148. Moreover, RAS# state machine 130 also receives the ABORT and RESTORE signals and in response to these signals deasserts the RAS# signal previously asserted and then reasserts the RAS# signal to the most recent accessed row. Accordingly, if both the restore bit and the ABORT signal are asserted, selecting device 124 drives at its output the old address signal thereby restoring the previous page. When the restore bit is not set, multiplexor 146 drives at its output the new address received at the "0" input of this multiplexor. In this way, if the restore bit is not asserted but the ABORT signal is asserted, multiplexor 148 drives at its output the new address received at the "1" input thereof.

The address decoder circuit 122 includes circuitry (not shown) such as a state machine configured to determine whether a memory access is a page hit, page miss or row miss. Such a state machine may include a storage device that stores a previously decoded address of a row. A comparator may be configured to compare a current row address with the previous row address. In case the address of the current row differs from the address of the most recently accessed row, the state machine of address decoder circuit 122 performs a row miss cycle. The state machine of address decoder circuit 122 may also include circuitry (not shown) that is configured to compare the memory address of the previous memory cycle with the memory address of the current memory cycle. In case these addresses coincide, a page hit cycle is performed. However, if the address of the current page does not coincide with the address of the previous page but the addresses of the previous row and the current row coincide, a page miss cycle is performed. The above-described state machine may well be implemented by one skilled in the art.

Figure 2:
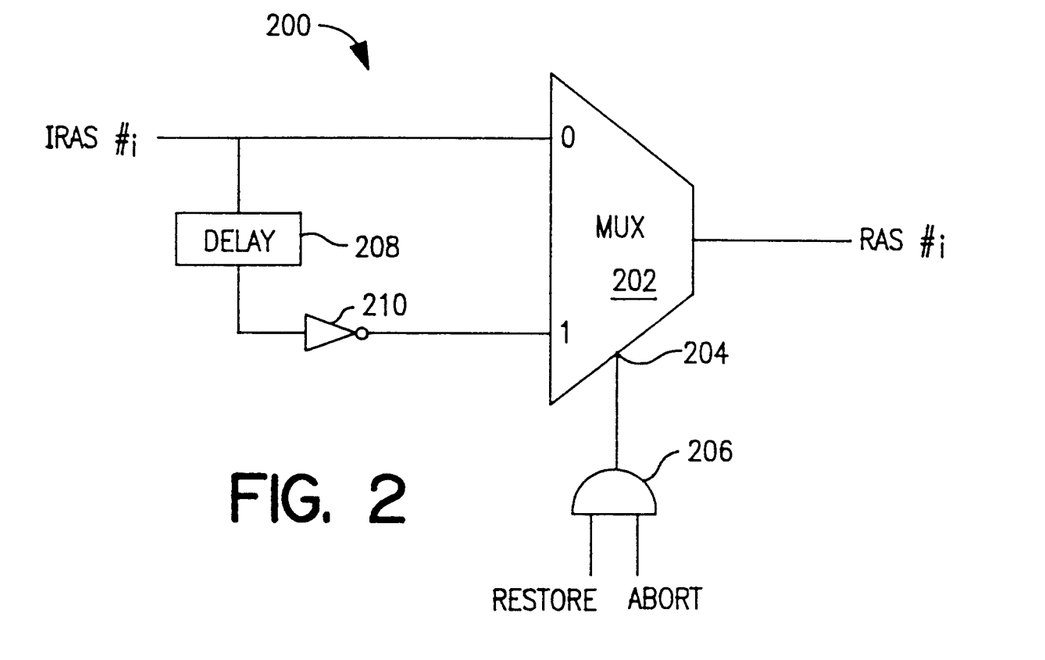
FIG. 2 illustrates a RAS#/restore circuit in connection with one embodiment of the computer system according to the present invention.

FIG. 2 illustrates a RAS# restore circuit 200 included in the RAS# state machine 130. The RAS# restore circuit 200 provides a way of restoring a page when an access cycle to the memory is a row miss or page miss, and the access is aborted. RAS# restore circuit 200 may be implemented for every RAS# line received by the RAS# state machine 130, i.e., RAS# restore circuit 200 is implemented for $1 \leq i \leq n$ where n is the number of rows in the DRAM (not shown).

IRAS#$_i$ is an internal signal corresponding to row$_i$ that, in the absence of circuit 200, would be driven out of the RAS# state machine 130 as an RAS# signal. Instead of driving each IRAS#$_i$ signal directly to a corresponding row, circuit 200 drives the IRAS#$_i$ signal to an input (input "0") of a multiplexor 202.

A control input 204 of multiplexor 202 is coupled to an output of an AND gate 206 that receives at first and second inputs thereof signals ABORT and RESTORE, respectively. It is contemplated by the present invention that gate 206 may receive other input signals in addition to ABORT and RESTORE signals. For example, an enable signal may be input to gate 206 such that when this signal is deasserted, a "0" logic is driven to input 204 thereby causing multiplexor 202 to select at its output the IRAS#$_i$ signal regardless of the logic state of the ABORT and RESTORE signals. In this way, circuit 200 may be utilized in conjunction with systems that do not adopt the restore feature described herein.

When one of the ABORT and RESTORE signals is deasserted (logic 0), multiplexor 202 selectively gates at its output the IRAS#$_i$ signal. However, when both ABORT and RESTORE signals are asserted, multiplexor 202 selectively gates at its output a signal corresponding to the IRAS#$_i$ signal delayed by a delay circuit 208 and passed through inverter 210. The delay circuit 208 may be a latch with a predetermined propagation time. Assume that a page is in an open state before a page or row miss cycle is aborted. As long as IRAS#$_i$ signal is asserted, the signal at the "1" input of multiplexor 202 is at logic 0. Once both the RESTORE and ABORT signals are asserted, the control signal to multiplexor 202 switches to logic 1, thereby causing multiplexor 202 to select the signal at the "1" input and output the signal received at input "1". The signal at the "1" input of multiplexor 202 is "0" as the IRAS#$_i$ signal was "1" before the assertion of RESTORE and ABORT signals and inverter 210 inverts the IRAS#1 signal.

In this way, the RAS#$_i$ signal switches to 0 logic for a predetermined time, which is substantially equal to the propagation time of the delay circuit 208. This propagation delay time is equal to at least the RAS# precharge time. Subsequently, after the predetermined time, the signal at the "1" input of multiplexor 202 becomes a logic 1 since the IRAS#$_i$ is deasserted, and inverter 210 inverts the IRAS#$_i$ signal. The same restore mechanism occurs when an open page is restored.

The following description presents different embodiments of paging processes according to the present invention that may control the functioning of the RAS# state machine 130 and the CAS# state machine 134 or can be implemented in software to control access, according to the present invention, to memory 106. In the following description, for purposes of describing the paging process according to the present invention, it is assumed that the memory device includes only two rows of memory, Row0 and Row1. Each of the rows of memory Row0 and Row1 include at least one page (hereinafter "page in Row0" and "page in Row1" respectively). The paging processes described hereinafter can be easily extended to the case where the memory includes more than two rows.

Figure 3:
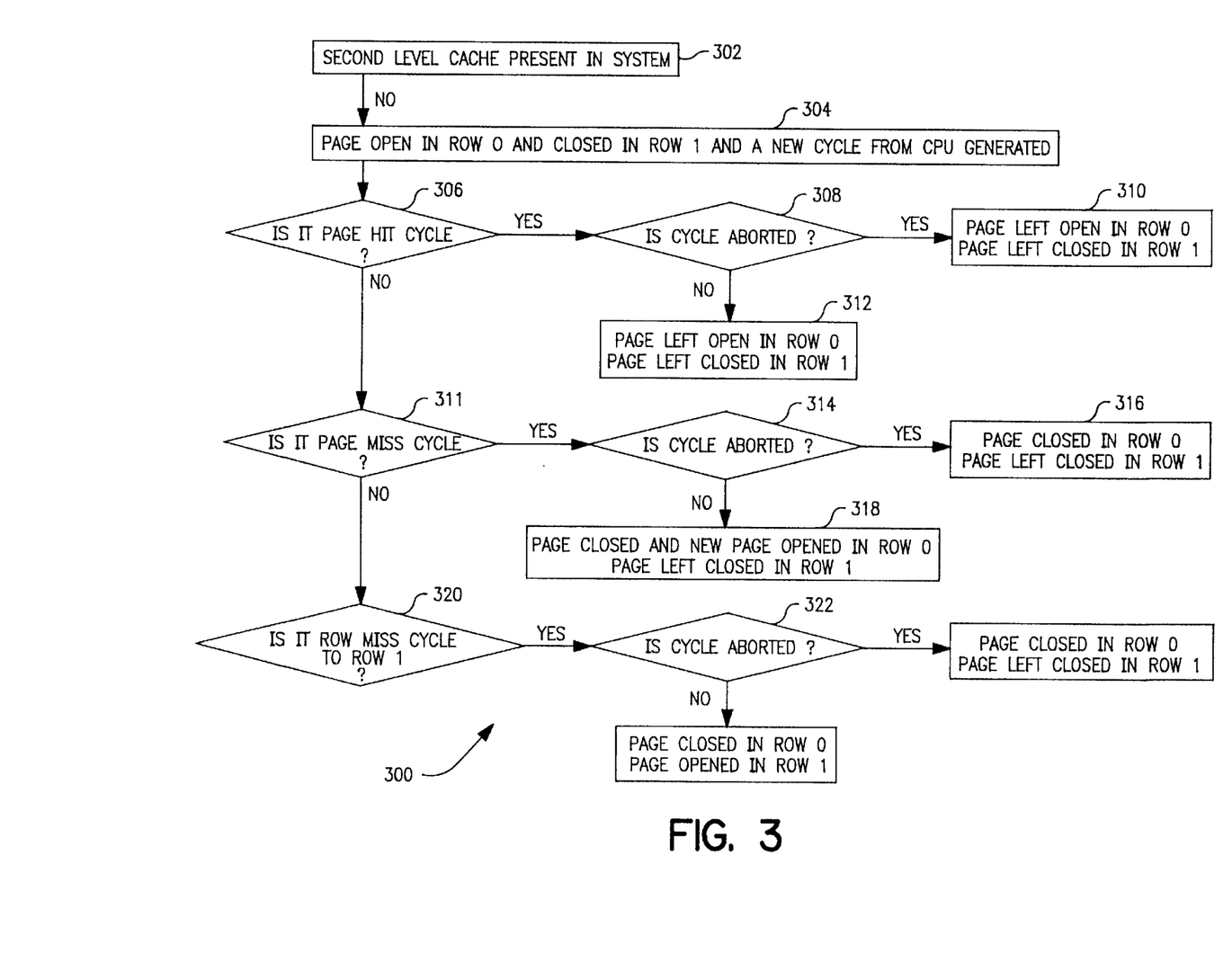
FIG. 3 illustrates a flowchart diagram for a first embodiment of a paging process according to the present invention.

FIG. 3 illustrates a flowchart diagram 300 for one embodiment (first embodiment) of a paging process (hereinafter "process 300") according to the present invention. The process 300 is directed to a memory device with a page open in Row0 and a page closed in Row1. The situation where a page in Row0 is closed and a page in Row1 is open may be treated similarly.

The embodiment of the paging process 300 described in connection with the flowchart of FIG. 3 may be extended by one skilled in the art to memory devices that include more than two rows. Moreover, the process described in connection with FIG. 3 relates to a computer system where a second level cache (L2) 109 is not present in the system.

The process starts at state 304 with a page open in Row0 and closed in Row1. When a new cycle is generated by the CPU, the process 300 passes to decision block 306 where it is determined whether the new cycle is a page hit cycle. If the new cycle is a page hit cycle, a flow path is taken to decision block 308 where it is determined whether the cycle is aborted. If the cycle is aborted, for example because the target of the CPU cycle is not in the main memory, but in a device coupled to a PCI bus, the opened page in Row0 is left open and the closed page in Row1 is left closed. It has been determined that after a page hit, there is a high likelihood that the next memory cycle will be to the same page in Row0. Since the current cycle is a page hit cycle, it is very likely that the memory controller will perform the next unaborted cycle to the open page in Row0. Therefore, leaving Row0 open may save clock cycles on the next memory access if such access is to Row0. If the cycle is not aborted, the process passes to block 312 where the page is left open in Row0 and the page is left closed in Row1.

However, if at decision block 306 it is determined that a current cycle is not a page hit cycle, the process flows to decision block 311 where it is determined whether the current cycle is a page miss cycle. If the current cycle is a page miss, a flow path is taken to decision block 314 where it is determined whether the current cycle is aborted. If so, the process flows to block 316 where the page in Row0 and the page in Row1 left closed. Since a page miss cycle entails opening a new page and therefore closing the current page, closing the page in Row0 may save at least one clock cycle on the next unaborted cycle. In this way, the next unaborted cycle that otherwise may have been a page miss cycle, had the page in Row0 been left open, is more likely to be a row miss cycle (to Row0) which requires less memory cycles than a page miss cycle. Accordingly, at least three cycles could be saved in this case since the RAS# signal in Row0 would not have to be precharged, deasserted, and again asserted.

If the page miss cycle is not aborted, the process flows from block 314 to block 318 where the open page in Row0 is closed and a new page corresponding to the address of the current page is opened in Row0. The page in Row1 is left closed.

However, if at block 311 it is determined that the current cycle is not a page miss the process passes to block 320 where it is determined whether the current cycle is a row miss cycle. If the current cycle is a row miss cycle to Row1, the process flows to decision block 322 where it is determined whether the cycle is aborted. If the cycle is aborted, the page is closed in Row0 is closed, since the next memory access is more likely to be to Row1 the page is left closed in Row1. If the cycle is not aborted, then the page in Row0 is closed, and a current page (corresponding to the current address) is opened in Row1.

Figure 4:
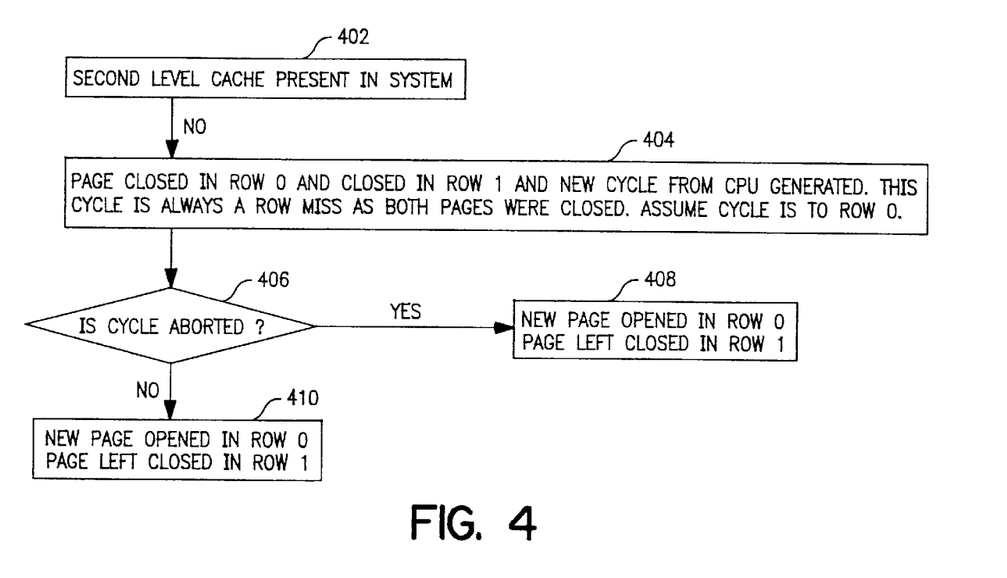
FIG. 4 illustrates a flowchart diagram for a second embodiment of a paging process according to the present invention.

FIG. 4 illustrates a flowchart diagram for a second embodiment of a paging process according to the present invention in connection with a computer system that does not include an L2 cache. The process starts at block 404, where it is assumed that both Row0 and Row1 do not include open pages at a beginning of a memory cycle. Also, it is assumed that a new CPU cycle is to Row0. Since Row0 is closed, the new CPU cycle is a row miss The process flows to decision block 406 where it is determined whether a cycle is aborted. If a cycle is aborted, the process flows to block 408 where a new page is opened in Row0 and a page is left closed in Row1. If the cycle is not aborted, the process flows to block 410 where a new page is opened in Row0 and a page is left closed in Row1.

Figure 5:
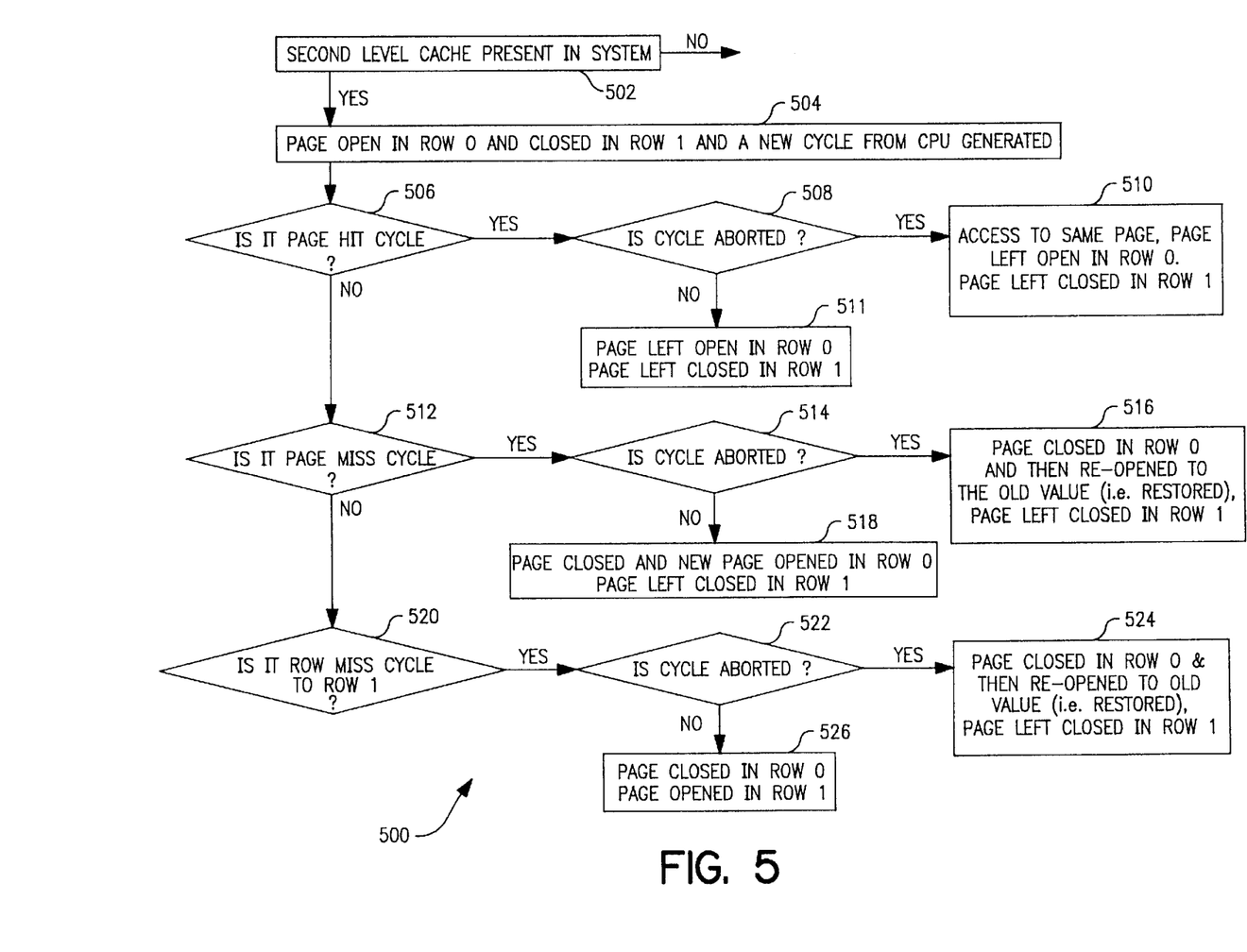
FIG. 5 illustrates a flowchart diagram for a third embodiment of a paging process according to present invention.

FIG. 5 illustrates an embodiment of a paging process 500 (hereinafter "process 500") according to the present invention in connection with a computer system that includes a second-level (L2) cache. It has been determined that when the computer system includes an L2 cache (such as L2 cache 109 shown in FIG. 1), the process described in conjunction with FIG. 5 leads to better performance results with respect to access time. The process 500 is explained in conjunction with a memory device that includes an open page in Row0 and a closed page in Row1 (block 504), it being understood that the same process applies to the case where a page is closed in Row0 and a page is open in Row1. The process 500 starts at block 504 from where it flows to decision block 506, where it is determined whether a new cycle from the CPU is a page hit cycle. If so, the process 500 flows to block 508 where it is determined whether the new cycle is aborted. If the new cycle is aborted, the process flows to block 510 where the page in Row0 is left open and the page in Row1 is left closed. If the new cycle from the CPU is not aborted, the process flows to block 511 where the page in Row0 is left open and the page in Row1 is closed.

However, if at block 506 it is determined that the new cycle from the CPU is not a page hit cycle, the process flows to block 512 where it is determined whether the new cycle is a page miss cycle. If so, the process flows to decision block 514 where it is determined whether the cycle is aborted. If the cycle is aborted, the process flows to block 516 where the page is closed in Row0 and then reopened (i.e. restored) to the old value, i.e. the same page is later opened in Row0. The page in Row1 is left closed. If it is determined in block 514 that the cycle is not aborted the process proceeds to block 518 where, the page in Row0 is closed and the new page in Row0 corresponding to the current address is opened. The page in Row1 is left closed.

From decision block 512, the process flows to decision block 520 if it is determined, at decision block 512, that the new cycle is not a page miss cycle. At block 520, it is determined whether the new cycle is a row miss cycle to Row1. If it is determined that the new cycle is a row miss cycle to Row1, the process 500 flows to decision block 522 where it is determined whether the cycle is aborted. If the cycle is aborted, then the process flows to block 524 where the page is closed in Row0 and then later reopened to the old value (i.e. restored). The page in Row1 is left closed. If it is determined in block 522 that the cycle is not aborted, the process flows to block 526 where the page in Row0 is closed and a page in Row1 is opened.

Figure 6:
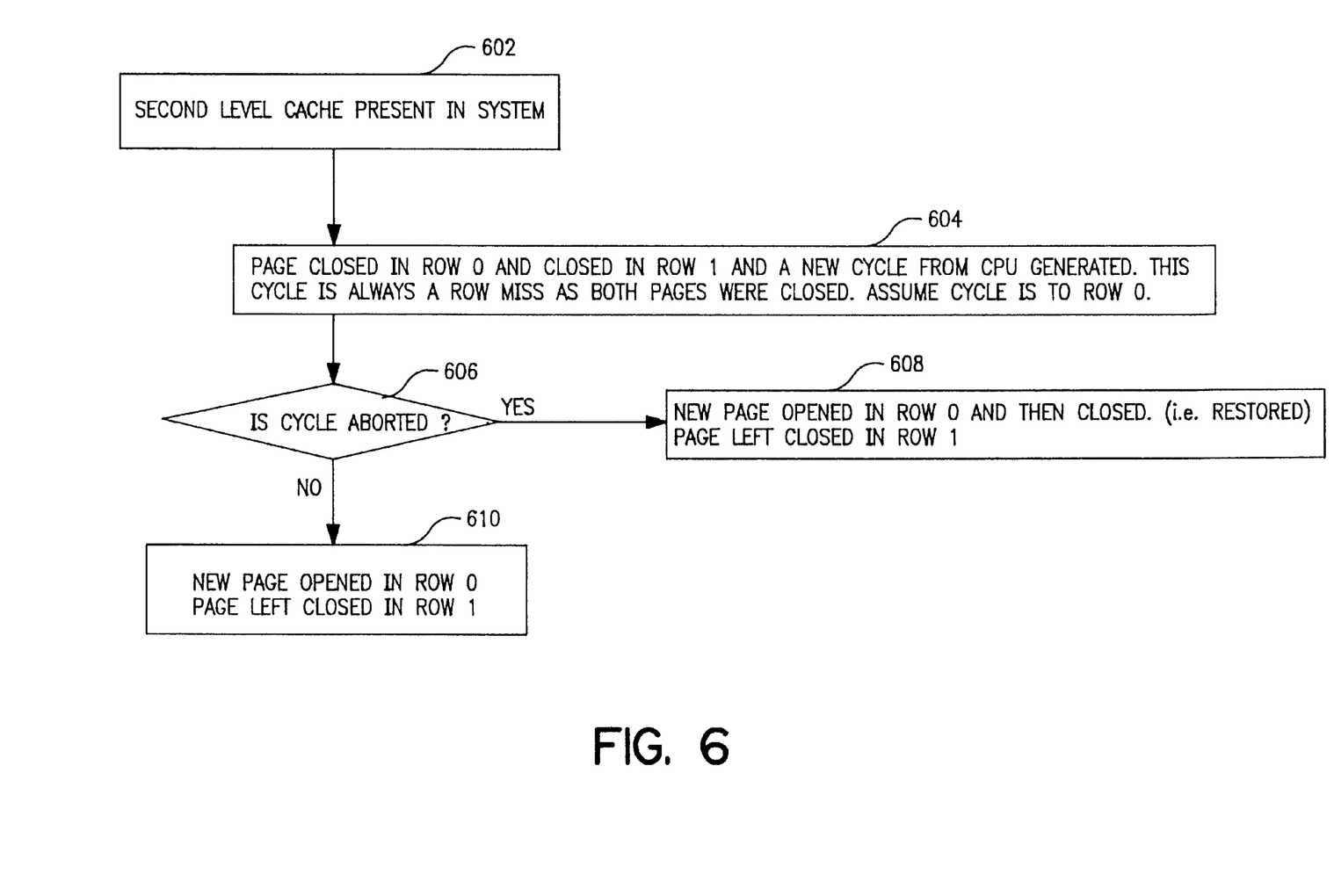
FIG. 6 illustrates a flow chart for a fourth embodiment of a paging process according to the present invention.

FIG. 6 illustrates a fourth embodiment of a paging process according to the present invention in connection with a computer system that includes a second-level cache and the pages in Row0 and Row1 are closed when a new cycle from the CPU is generated (block 604). From block 604, the process 600 flows to decision block 606 where it is determined whether a new cycle is aborted. If the new cycle is aborted, the process passes to block 608 where a new page is opened in Row0 and then closed (i.e. restored) and a page in Row1 is left closed. If it is determined in block 506 that the cycle is not aborted, the process passes to block 610 where a new page is opened in Row0 and a page in Row1 is left closed. Note that in systems utilizing a second level cache, when a cycle is aborted, the previous state of a page is restored if the cycle is a page miss or row miss. If the cycle is not aborted, then the processes described in connection with FIGS. 5 and 6 are performed in the same way as the processes described in FIGS. 3 and 4 respectively.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A computer system comprising:
   a processor;
   a storage device coupled to said processor, said storage device including at least one page that is in one of an open state and a closed state; and
   a control circuit coupled to said processor and to said storage device, said control circuit configured to change a state of said at least one page and, a predetermined time thereafter, to restore said state when one of a page miss cycle and a row miss cycle to said at least one page is aborted.

2. The computer system of claim 1 wherein said control circuit includes a selecting device configured to selectively drive at least one address input to said storage device.

3. The computer system of claim 2 wherein said selecting device is configured to receive at least a restore signal from a restore address resister to restore an address of a page previously accessed.

4. The computer system of claim 1 wherein said control circuit includes a first circuit configured to receive an address and responsive thereto to determine whether an access to said storage device is one of at least a page miss cycle and a row miss cycle.

5. The computer of system of claim 4 wherein responsive to said address, said first circuit configured to enable at least one row of said storage device.

6. The computer system of claim 4 further including a second circuit configured to determine whether a memory cycle is to a cache, and if said memory cycle is to a cache said computer system configured to generate an ABORT signal to said selecting device.

7. In a computer system including a first storage device that has at least one page that is in one of an open state and a closed state, a process for accessing said at least one page, said process comprising the steps of:
   a. if a second level cache is present in said computer system, determining whether a cycle to said at least one page is one of a page miss and a row miss;
   b. if the cycle is one of a page miss and row miss, determining whether the cycle is aborted and if the cycle is aborted;
   c. changing a state of said at least one page; and
   d. restoring the state of said at least one page, a predetermined number of cycles thereafter.

8. In a computer system including a second level cache, a process for accessing a page the process comprising:
   a. determining whether a cycle to said first page is a page miss, said first page included in a storage device of said computer system, said storage device including first and second rows having said first page that is open and a second page that is closed respectively;
   b. determining whether the cycle is aborted responsive to a determination that said cycle to said first page is a page miss; and
   c. closing said first page in said first row, and opening a third page in said first row responsive to a determination that said cycle is not aborted.

9. In a computer system including a second level cache and a storage device that includes first and second rows having a page that is open and a second page that is closed respectively, a process for accessing a page of one of said first and second rows, said process comprising:
   a. determining whether a cycle to the page of said first row is a row miss;
   b. if so, determining whether the cycle is aborted; and
   c. if the cycle is not aborted, closing the page in the first row, and opening a third page in the second row.

* * * * *

UNITED STATES PATENT AND TRADEMARK OFFICE
CERTIFICATE OF CORRECTION

PATENT NO.    : 5,940,848
DATED         : August 17, 1999
INVENTOR(S)   : Bains It is certified that error appears in the above-identified patent and that said Letters Patent is hereby corrected as shown below:

<u>Title page, Item [54] and Column 1, line 4,</u>
Delete "ON" and insert -- OR --.

Signed and Sealed this

Twenty-seventh Day of May, 2003

JAMES E. ROGAN
*Director of the United States Patent and Trademark Office*